United States Patent
Boettiger et al.

(10) Patent No.: US 9,405,596 B2
(45) Date of Patent: Aug. 2, 2016

(54) CODE VERSIONING FOR ENABLING TRANSACTIONAL MEMORY PROMOTION

(71) Applicant: GLOBALFOUNDRIES INC., Grand Cayman (KY)

(72) Inventors: Hans Boettiger, Tuebingen (DE); Yaoqing Gao, North York, CA (US); Martin Ohmacht, Yorktown Heights, NY (US); Kai-Ting Amy Wang, North York, CA (US)

(73) Assignee: GlobalFoundries, Inc., Grand Cayman (KY)

( * ) Notice: Subject to any disclaimer, the term of this patent is extended or adjusted under 35 U.S.C. 154(b) by 70 days.

(21) Appl. No.: 14/504,832

(22) Filed: Oct. 2, 2014

(65) Prior Publication Data
US 2015/0113229 A1    Apr. 23, 2015

(30) Foreign Application Priority Data
Oct. 22, 2013   (CA) .................................... 2830605

(51) Int. Cl.
*G06F 9/45* (2006.01)
*G06F 9/52* (2006.01)

(52) U.S. Cl.
CPC .............. *G06F 9/528* (2013.01); *G06F 8/4436* (2013.01); *G06F 8/452* (2013.01)

(58) Field of Classification Search
CPC ....... G06F 9/528; G06F 8/4436; G06F 8/452; G06F 8/456
See application file for complete search history.

(56) References Cited

U.S. PATENT DOCUMENTS

| | | | | |
|---|---|---|---|---|
| 5,491,823 A | * | 2/1996 | Ruttenberg | G06F 8/452 717/161 |
| 5,701,489 A | * | 12/1997 | Bates | G06F 8/4436 717/144 |
| 6,035,125 A | * | 3/2000 | Nguyen | G06F 8/452 717/160 |
| 6,189,137 B1 | * | 2/2001 | Hoffman | G06F 8/4436 717/115 |
| 7,543,282 B2 | | 6/2009 | Chou | |
| 8,151,252 B2 | | 4/2012 | Song et al. | |
| 8,166,486 B2 | | 4/2012 | Song et al. | |
| 2005/0131977 A1 | * | 6/2005 | Bera | G06F 8/452 708/446 |
| 2005/0198627 A1 | * | 9/2005 | Du | G06F 8/452 717/160 |
| 2006/0161740 A1 | * | 7/2006 | Kottapalli | G06F 9/528 711/152 |

(Continued)

FOREIGN PATENT DOCUMENTS

WO   2012040742 A2   3/2012

OTHER PUBLICATIONS

Joseph L. Greathouse et al., "A Case for Unlimited Watchpoints", [Online], ACM 2012, pp. 1-13, [Retrived from Internet on Apr. 11, 2016], <http://www.cs.cmu.edu/afs/cs/usr/hxin/www/pdf/asplos2012_unlimited_watchpoints.pdf>.*

(Continued)

*Primary Examiner* — Thuy Dao
*Assistant Examiner* — Ziaul A Chowdhury
(74) *Attorney, Agent, or Firm* — David Cain; Hoffman Warnick LLC

(57) ABSTRACT

Code versioning for enabling transactional memory region promotion may include receiving a portion of candidate source code; outlining the portion of candidate source code received for parallel execution; wrapping a critical region with entry and exit routines to enter into a speculation subprocess, wherein the entry and exit routines also gather conflict statistics at run time; and generating an outlined code portion comprising multiple loop versions using a processor.

17 Claims, 8 Drawing Sheets

(56) References Cited

U.S. PATENT DOCUMENTS

| | | | |
|---|---|---|---|
| 2008/0256073 A1* | 10/2008 | Detlefs | G06F 9/528 |
| 2009/0199171 A1* | 8/2009 | Roe | G06F 8/4436 717/163 |
| 2009/0288075 A1 | 11/2009 | Song et al. | |
| 2011/0314244 A1* | 12/2011 | Sodhi | G06F 9/528 711/164 |
| 2015/0052308 A1* | 2/2015 | Ray | G06F 9/528 711/125 |

OTHER PUBLICATIONS

James Tuck et al. "SoftSig: Software-Exposed Hardware Signatures for Code Analysis and Optimization", [Online], ACM 2008, pp. 145-156, [Retrieved from Internet on Apr. 11, 2016], <http://www.cs.cmu.edu/~chensm/LBA_reading_group/papers/SoftSig-asplos08.pdf>.*

Milind Kulkarni et al., "Optimistic Parallelism Benefits from Data Partitioning", [Online], ACM 2008, pp. 1-11, [Retrieved from Internet on Apr. 11, 2016], <http://faculty.kfupm.edu.sa/coe/mayez/ps-coe502/Project-references/OpenAcc-PGI-Thurst-Galois/OPenACC-Directives-GPU/asplos08.pdf>.*

Tim Harris et al., "Dynamic Filtering: Multi-Purpose Architecture Support for Language Runtime Systems", [Online], ACM 2010, pp. 1-13, [Retrieved from Internet on Apr. 11, 2016], <http://www.msr-waypoint.com/pubs/121330/2010-asplos.pdf>.*

Gottschlichy, J.E. et al., "An Efficient Lock-aware Transactional Memory Implementation," In Proc. of 4th Workshop on the Implementation, Compilation, Optimization of Object-Oriented Languages and Programming Systems, pp. 10-17, ACM, 2009.

Volos, H. et al., "Pathological Interaction of Locks with Transactional Memory," In 3rd ACM SIGPLAN Workshop on Transactional Computing, Feb. 2008, 9 pg.

Liu, Y. et al., "OpenMP Application in TM-based Parallel Program." In 2012 Int'l. Conf. on Computer Science and Electronics Engineering (ICCSEE), vol. 3, pp. 599-603, IEEE, 2012.

* cited by examiner

Original source: ⎫ 502

```
#pragma omp parallel for
for (int i = 0; i < N; i++) {
  NC1
  #pragma tm_atomic {
    C
  }
  NC2
}
```
— 508
— 510

After OpenMP outlining: ⎫ 504

```
__OpenMP_setup(outlined_func,...)
;
outlined_func(lb, ub) {
  for (int i = lb; i < ub; i++) {
    NC1
    #pragma tm_atomic {
      C
    }
    NC2
  }
}
```
— 512

After TM Promotion with Loop Versioning: ⎫ 506

```
__OpenMP_setup(outlined_func,...)
;
outlined_func(lb,ub) {
  if (threshold for TM promotion && !conflictH1) {   — 514
    #pragma tm_atomic {                              — 520
      for (int i = lb; i < ub; i++) {
        NC1
        C
        NC2
      }
    }
  } else if (threshold for TM && !conflictH2) {      — 516
    for (int i = lb; i < ub; i++) {                  — 524
      NC1
      #pragma tm_atomic {
        C
      }
      NC2
    }
  } else { // default lock based approach            — 518
    for (int i = lb; i < ub; i++) {                  — 522
      NC1
      #pragma omp critical {
        C
      }
      NC2
    }
  }
}
```

NC1 – non-critical segment 1
NC2 – non-critical segment 2
C – critical segment

Code snippet
500

FIG. 5

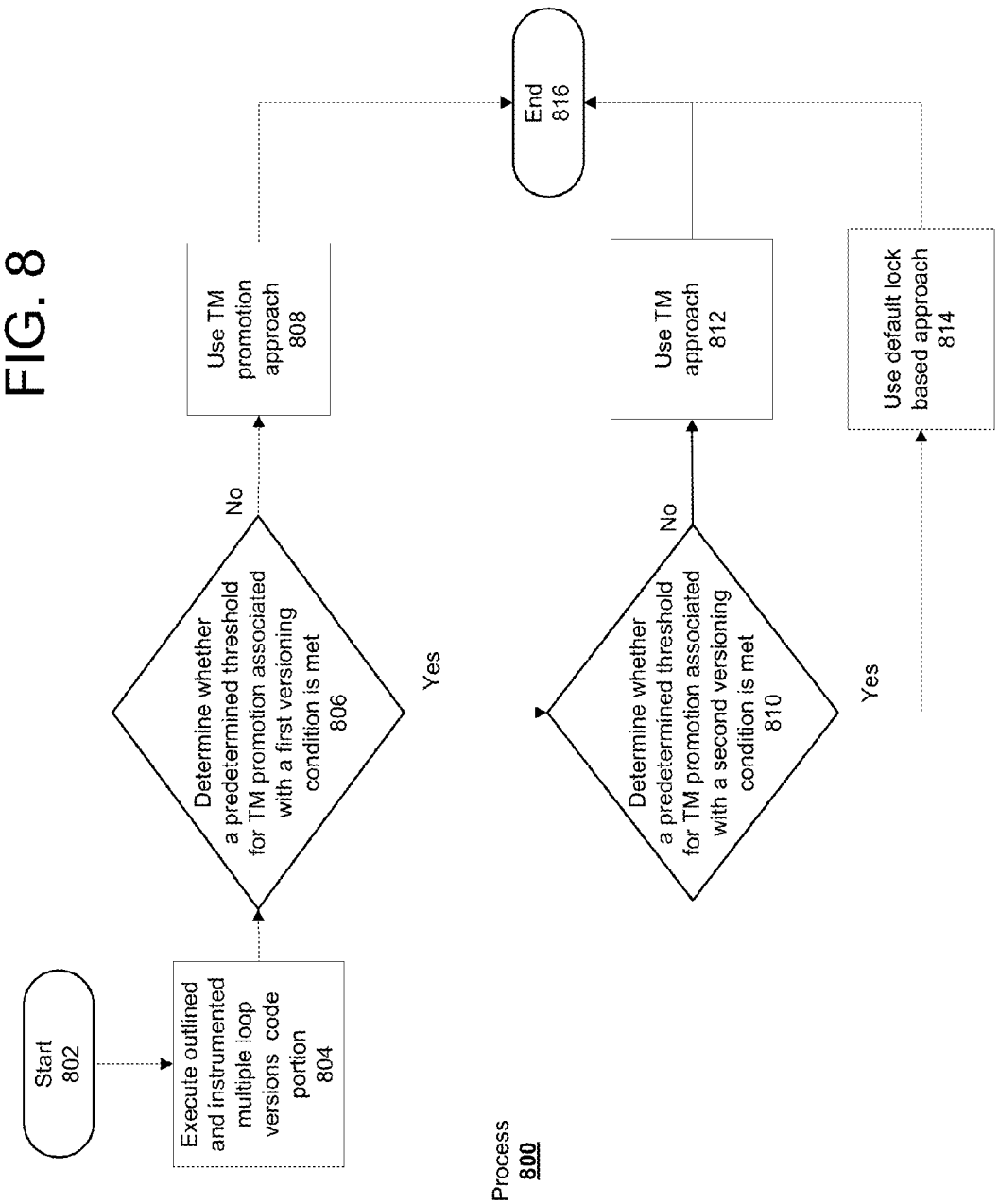

CODE VERSIONING FOR ENABLING TRANSACTIONAL MEMORY PROMOTION

CROSS-REFERENCE TO RELATED APPLICATIONS

This application claims the benefit of Canada Application Number 2830605 filed on Oct. 22, 2013, which is fully incorporated herein by reference.

BACKGROUND

Developers of a program in which parallelism is used often spend great effort in minimizing the amount of code inside a critical region because critical regions are traditionally implemented using locks and are typically points of serialization in the parallel program. Recent advances in hardware to support transactional memory (TM) offers a lock free mechanism for implementing a critical region. That is, threads concurrently and optimistically execute the critical region in parallel, and only where there are conflicts, one thread will survive and others will abort. The use of transactional memory therefore typically provides a capability to parallelize the critical region. In even a worst-case scenario, processing performance typically becomes no worse than serializing the region using a lock.

However, typical results indicate the overhead of entering and exiting a hardware transaction is in the order of 3-4 times the overhead of when a conventional larx/stcx lock is used. The management of context saves and restores of registers further adds to the observed overhead. Therefore, when a naïve developer creates a parallel program and simply replaces the usage of a lock with the usage of TM on critical regions, the developer may often observe either no improvement in processing performance or even a significant degradation in processing performance, even under conflict free situations. This observed behavior may occur because existing critical regions tend to be fairly small and the TM overhead cannot be properly amortized over such small regions.

SUMMARY

According to one embodiment, a computer-implemented process for code versioning for enabling transactional memory region promotion comprises receiving a portion of candidate source code; outlining the portion of candidate source code received for parallel execution; wrapping a critical region with entry and exit routines to enter into a speculation sub-process, wherein the entry and exit routines also gather conflict statistics at run time; and generating an outlined code portion comprising multiple loop versions using a processor.

According to another embodiment, a computer program product for code versioning for enabling transactional memory region promotion comprises a computer readable storage medium having program instructions embodied therewith. The computer readable storage medium is not a transitory signal per se. The program instructions are executable by a processor to perform a method comprising receiving a portion of candidate source code; outlining the portion of candidate source code received for parallel execution; wrapping a critical region with entry and exit routines to enter into a speculation sub-process, wherein the entry and exit routines also gather conflict statistics at run time; and generating an outlined code portion comprising multiple loop versions using a processor.

According to another embodiment, an apparatus for code versioning for enabling transactional memory region promotion comprises a communications fabric; a memory connected to the communications fabric, wherein the memory contains computer executable program code; and a processor unit connected to the communications fabric. The processor unit, responsive to executing the computer executable program code, initiates executable operations comprising receiving a portion of candidate source code; outlining the portion of candidate source code received for parallel execution; wrapping a critical region with entry and exit routines to enter into a speculation sub-process, wherein the entry and exit routines also gather conflict statistics at run time; and generating an outlined code portion comprising multiple loop versions.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 5 is a textual representation of source code snippets representative of the stages of the process of the code versioning optimization system of FIG. 3 in accordance with one embodiment of the disclosure.

FIG. 8 is a flowchart of a run time process using the code versioning optimization system of FIG. 3 in accordance with one embodiment of the disclosure.

DETAILED DESCRIPTION

Figure 1:
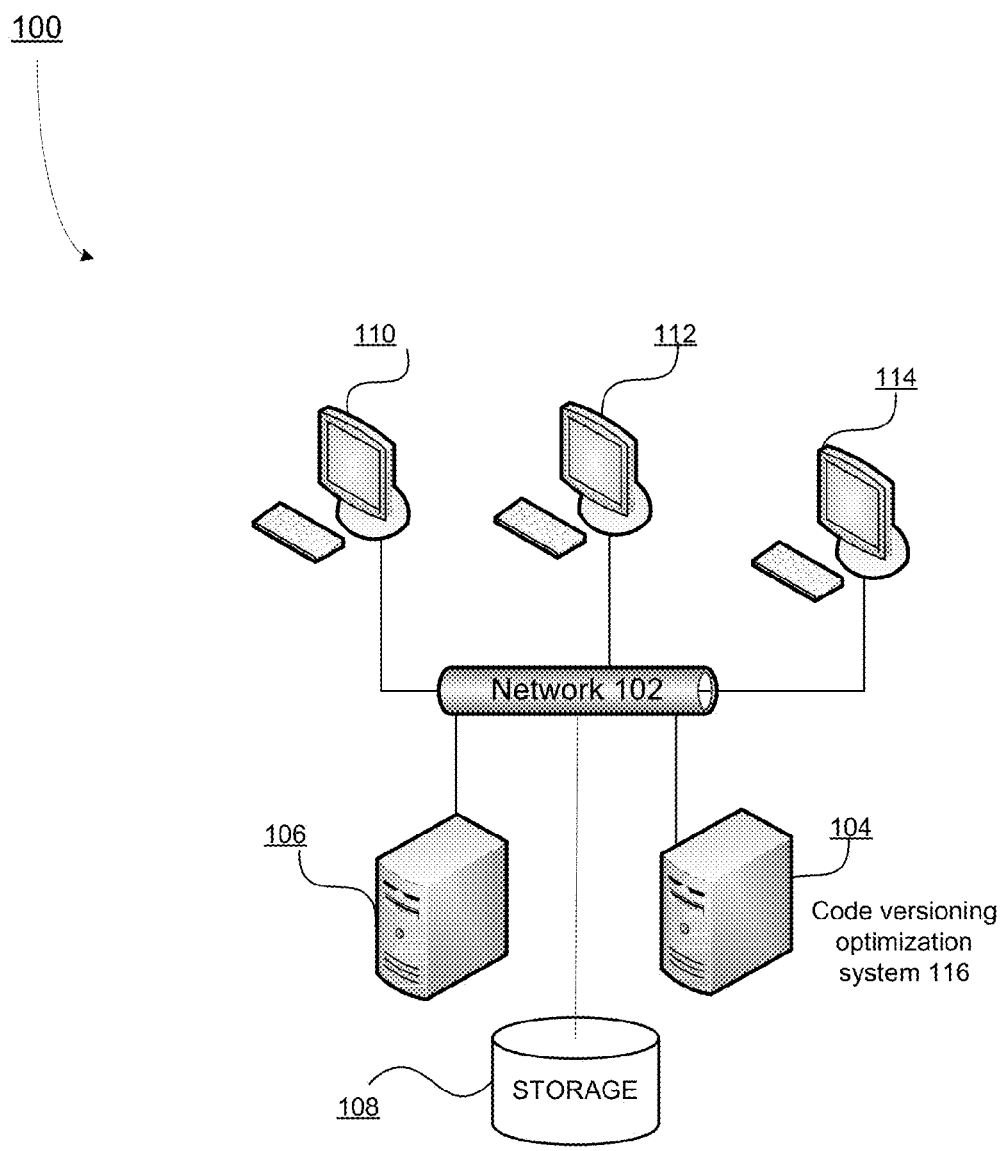
FIG. 1 is a block diagram of an exemplary network data processing system operable for various embodiments of the disclosure.

This disclosure relates generally to use of transactional memory in a data processing system and more specifically to optimization using code versioning for enabling transactional memory region promotion in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
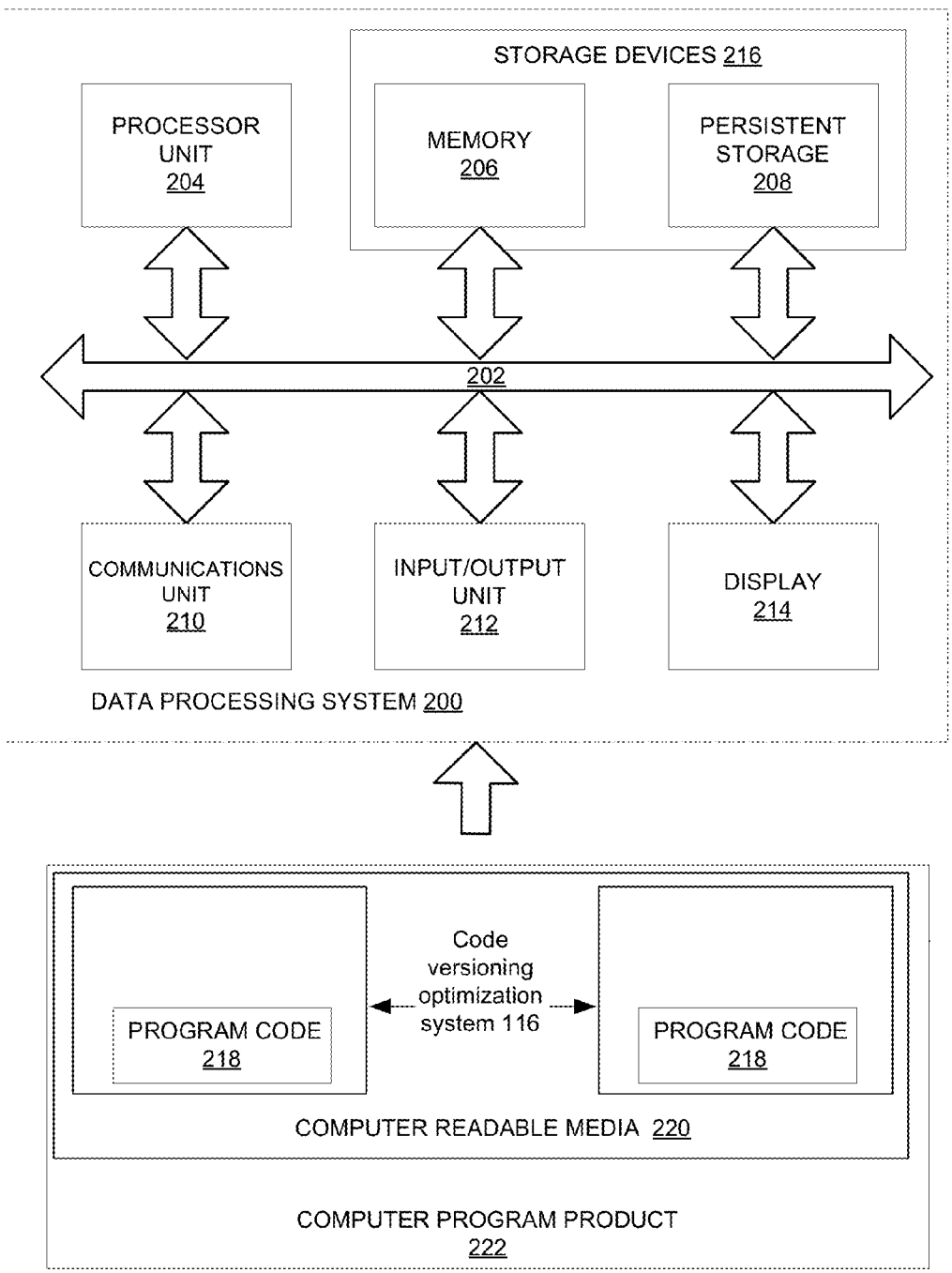
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, an embodiment of code versioning optimization system 116 and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation.

Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs including an embodiment of code versioning optimization system 116 of FIG. 1 may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable media 220 form computer program product 222 in these examples. In one example, computer readable media 220 may be in a tangible non-transitory form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory forming a computer readable storage device 224 containing an embodiment of code versioning optimization system 116 of FIG. 1 that is connected to data processing system 200. The tangible non-transitory form of computer readable media 220 is also referred to as computer recordable storage media or a computer readable data storage device 224. In some instances, computer readable storage media 220 may not be removable.

Alternatively, program code 218 including an embodiment of code versioning optimization system 116 of FIG. 1 may be transferred to data processing system 200 from computer readable media 220 as computer readable signal media 226 through a communications link to communications unit 210 and/or through a connection to input/output unit 212. The communications link and/or the connection may be physical or wireless in the illustrative examples of computer readable signal media 226.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for code versioning for enabling transactional memory region promotion is presented. Processor unit 204 receives a portion of candidate source code and performs an outlining of the portion of candidate source code received for parallel execution. Processor unit 204 further wraps a critical region with entry and exit routines to enter into a speculation sub-process. The entry and exit routines also gather conflict statistics at run time. Processor unit 204 generates an outlined code portion comprising multiple loop versions. Processor unit 204 further executes the outlined code portion to determine which one of the multiple loop versions to use according to the conflict statistics gathered at run time.

Using an embodiment of the disclosed process an enhanced compiler judiciously enlarges a critical region by aggregating more work in the form of a number of loop iterations into the region, to amortize the transactional memory (TM) enter and exit overheads. The transformation using TM promotion (incrementally increasing the number of loop iterations into a single transaction) carefully balances conflict probability as well as speculative state capacity of the hardware with a cost model. The transformation is dynamically adjusted using run time statistics reflecting the conflict probability for a conflict associated with each variant of using transactional memory.

Figure 3:
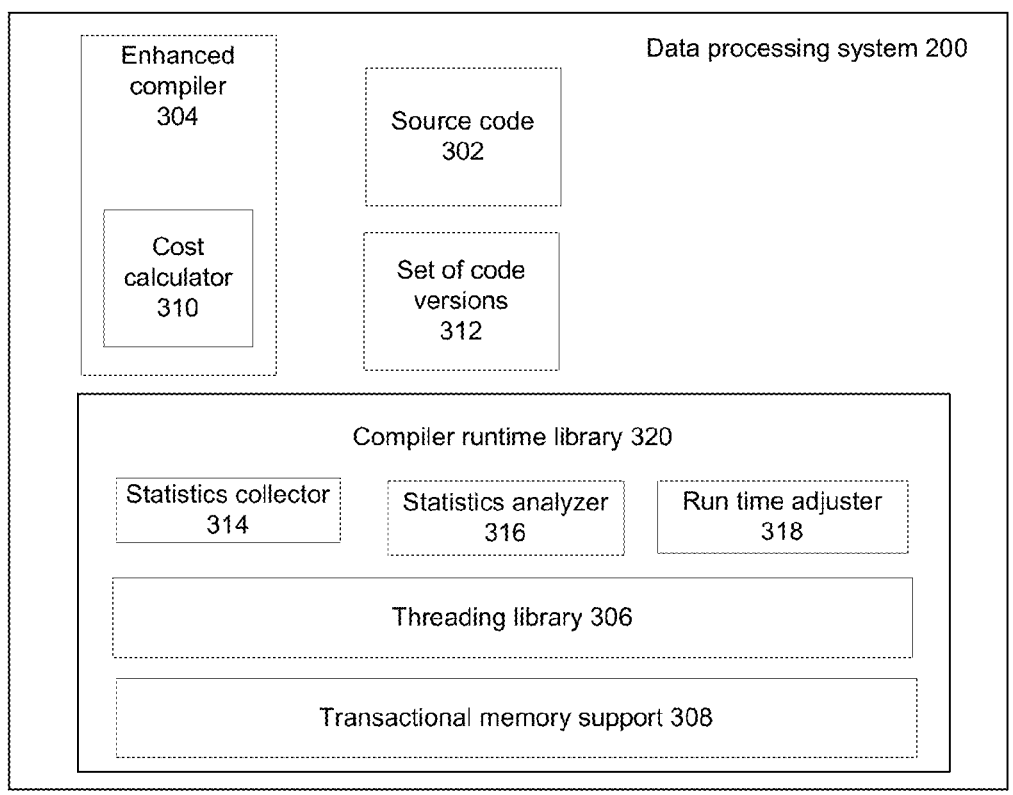
FIG. 3 is a block diagram representation of components of a code versioning optimization system operable for various embodiments of the disclosure.

With reference to FIG. 3 a block diagram of a code versioning optimization system, operable for various embodiments of the disclosure is presented. Code optimization system 300 is an example of a selective optimization system of the disclosure using code versioning and transactional memory support of an underlying computing platform.

Code versioning optimization system 300 leverages the support of an underlying system such as network data processing 100 of FIG. 1 or data processing system 200 of FIG. 2. In this example, data processing system 200 represents a host system in which an embodiment to the disclosure is implemented. Code versioning optimization system 300 includes a number of functional elements comprising source code 302 as the input to the data processing system, enhanced compiler 304 which includes the cost calculator 310, enhanced compiler runtime library 320 which includes threading library 306, transactional memory support 308 which further includes, statistics collector 314, statistics analyzer 316 and run time adjuster 318. The output of the data processing system is the set of code versions 312.

Code versioning optimization system 300 includes a number of functional components, which may be implemented as depicted or in another manner in which differing combinations of the functional elements are contained within one or more composite functional elements. For example, without loss of function enhanced compiler 304, and cost calculator 310 may comprise a functional unit rather than discrete functional elements. In another example, statistics collector 314, statistics analyzer 316 and run time adjuster 318 may form a functional unit rather than remain as discrete functional elements.

Source code 302 provides the input material for the remaining sub-processes of the disclosed process in the form of set of instructions comprising all or a portion of an application program source code. The source code representative of a portion of a program includes one or more critical regions along with one or more non-critical regions. The one or more critical regions are to be examined as candidates for using transactional memory support 308. Routines provided in threading library 306 as well as 308, which also includes statistics collector 314, statistics analyzer 316, run time adjuster 318, are two key components of the enhanced compiler runtime library 320.

Enhanced compiler 304 provides a capability of receiving source code 302 as a compilation unit and through a series of processes generating set of code versions 312. Enhanced compiler 304 includes support for outlining to support OpenMP parallel region with usage of thread library 306, and generating code that exploits transactional memory support 308. Further enhanced compiler 304 includes support for use of cost calculator 310 in the generation of set of code versions 312. Transactional memory support 308 also includes the capability to gather statistics for identified portions of compiled code during execution in the run time environment via statistics collector 314.

Threading library 306 provides a collection of routines used to enable a compiled version of the program to execute with multiple threads. In the current example, a library of routines conforming to the OpenMP specifications is used, however other libraries or sets of functions, which are comparable to the OpenMP specified set of functions may be used without departure from the disclosed process.

Transactional memory support 308 provides a capability for a specific group of load and store instructions, such as those in a critical region of code, to execute atomically. Transactional memory support 308 provides a control mechanism for concurrent controlling access to shared memory portions in concurrent computing as found in parallel processing applications. Hardware transactional memory systems typically comprise one or more of, or combinations thereof of specialized processors, cache memory and bus protocol to support transactions using the transactional memory. In the current example, hardware transactional memory is presumed to support processing of instructions identified in the critical region of the set of instructions comprising the program.

Cost calculator 310 provides a set of services used to provide an estimated processing cost associated with a specified code path. The cost is typically reflected in a number of machine cycles used to perform a series of operations associated with processing an identified code segment. An identified cost, obtained as output may be used in subsequent processes to select a code path to use, based on a determination of which cost is preferable.

Set of code versions 312 is the output of enhanced compiler 304 in combination with cost calculator 310. The output is in the form of one or more code versions wherein a code version is specific to a hardware implementation of a computing platform and a respective candidacy for using threading library 306 and transactional memory support 308. Each version in the set of code versions 312 represents a selected optimization using a specific path of execution in the program. For example, a first code version supports transactional memory promotion associated with a first conflict parameter, referred to as conflictH1, a second code version supports transactional memory associated with a second conflict parameter, referred to as conflictH2 and a third code version supports conventional lock processing without using transactional memory. Runtime statistics are collected for use in adjusting the tuning parameters of lower bound (lb), upper bound (ub), conflictH1, conflictH2 that accordingly alters a selected path of code execution from the three version categories. For example, a conflict is a retry operation associated with a conditional or speculative load or store operation using transactional memory. Values of conflictH1, conflictH2 reflect either true when a predetermined threshold value is exceeded or false when not exceeded. The default setting of conflictH1 and conflictH2 are false to favor use of the transactional memory code paths, and the runtime adjuster may set them to true based on runtime statistics if too many conflicts are recorded.

Statistics collector 314 provides a capability to gather predetermined information associated with the runtime performance or other characteristics of the execution of the source code compiled by enhanced compiler 304. Typical statistics gathered include execution time, instruction path, conflict counts, cache usage, and wait time. Statistics can be specific to a thread or combination of threads as desired and supported by the computing platform.

Statistics analyzer 316 provides a capability to receive the gathered predetermined information associated with the runtime performance and other characteristics of the runtime execution of the source code compiled by enhanced compiler 304 as collected by statistics collector 314. An analysis is performed to provide tuning parameters for the versioning conditions in set of code versions 312. Output of statistics analyzer 316 may be saved in a predetermined data set for later use or immediate use in one or more run time instances of the program to improve performance of the program. For example, a first region executes a critical region of program code using a statically derived versioning condition with default parameter settings. Statistics of the runtime execution are then analyzed. As a result, a next execution of the critical region of program code (or execution of one or more similar parallel regions) may receive modified tuning parameters from the analysis results to enter into a code path of a different version.

Run time adjuster 318 provides a capability to alter the processing of a next instance of a specific program portion, for example a next iteration of the previously executed critical region of program code or one or more parallel regions scheduled for execution. Run time adjuster 318 alters the tuning parameters, such as the upper bound (ub) or lower bound (lb), conflictH1 or conflictH2 in the versioning condition according to information received from statistics analyzer 316. For example, such adjustment may alter selection of one of the set of code versions available.

Figure 6:
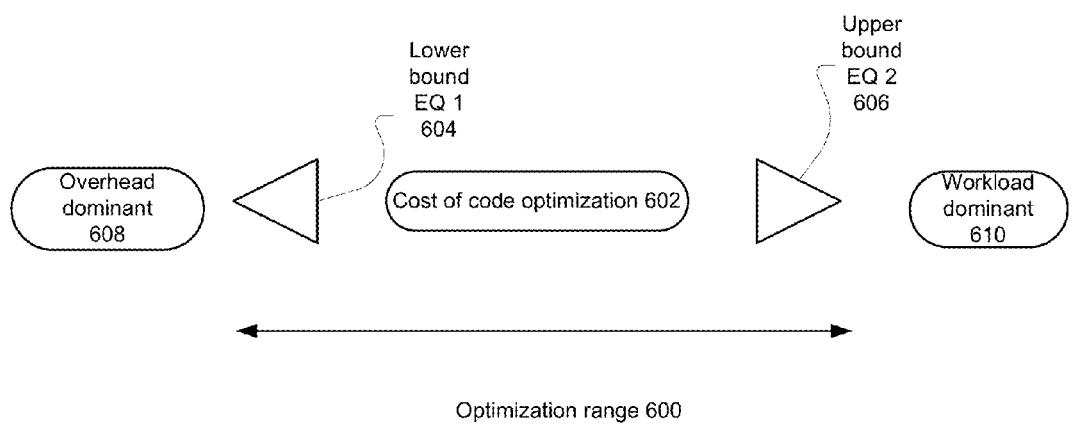
FIG. 6 is a block diagram of an optimization range associated with using the code versioning optimization system of FIG. 3 in accordance with one embodiment of the disclosure.

The upper bound (ub) and lower bound (lb) are further described, using FIG. 6 and associated text, in the context of a cost analysis using terms of Equation 1 and Equation 2 respectively. For example, assume a loop with n number of iterations, each of the iterations with c cycles in an associated critical region, nc number of cycles in a non-critical region and t threads to execute the parallel loop. The number of cycles 'c' represents a total time (measured in machine cycles) spent inside critical region(s) while the number of cycles 'nc' represents a total time spent in non-critical region(s). A number of cycles 'x' represent the transaction memory enter and exit overhead. A number of cycles 'y' represent the default locking overhead (per one critical region).

Using the variables described, Equation 1 is derived on first performing transaction promotion where k iterations of the loop are executed inside the transaction. Specifically, n*(c+x+nc)/t becomes n/k*((c+nc)*k+x)/t through the promotion process. Then constraining n/k*((c+nc)*k+x)/t to be less than n*(c+nc) which is the time taken by sequential execution; the inequality condition defined is expressed by Equation 1. With use of transactional memory and k iterations, a cost expression is defined referred to as Equation 1 or as a lower bound EQ1 as: n/k*((c+nc)*k+600)/t cycles. At this value of k, where k>600/((c+nc)*(t-1)). The lower bound identifies a point at which performance of the transactional memory case begins to outperform a serial execution instance.

Equation 2 is representative of an upper bound condition. An upper bound is calculated against a total number of unique load and store operations in a particular workload by estimating each thread capacity as M/T bytes. A speculative state buffer in a cache is represented as M bytes and a total number of hardware threads is represented as T. Each speculative load or speculative store occupies a respective cache line, therefore, the thread capacity is further divided by the size of a cache line as in (M/T)/cache line (Equation 2)

Simple compilation of source code comprises a translation or transformation of the source code into an executable form typically directed toward a specific computing platform. Rather than a simple compilation, an optimizing transformation may be used to provide an application better overall performance at run time. Optimizations can use various transformations to reduce a number of instructions executed for critical operations; restructure generated object code to make optimal use of a specific hardware architecture; improve usage of a particular memory subsystem and to exploit a capability of an architecture to handle large amounts of shared memory parallelization. In general optimizations try to make the application run faster than when complied using simple compilation.

Programming models such as OpenMP allow programmers to write high-performance code; however, the optimizations typically require trade-offs in run-time performance, hand-coded segments of code and portability of the source code. For example, an optimization of source code performs high-order transformations using a hardware transactional memory capability of a target platform, to provide additional loop optimization by promoting the source code to use the optimization when available. This example may be useful for a scientific application processing a large quantity of numerical data.

Figure 4:
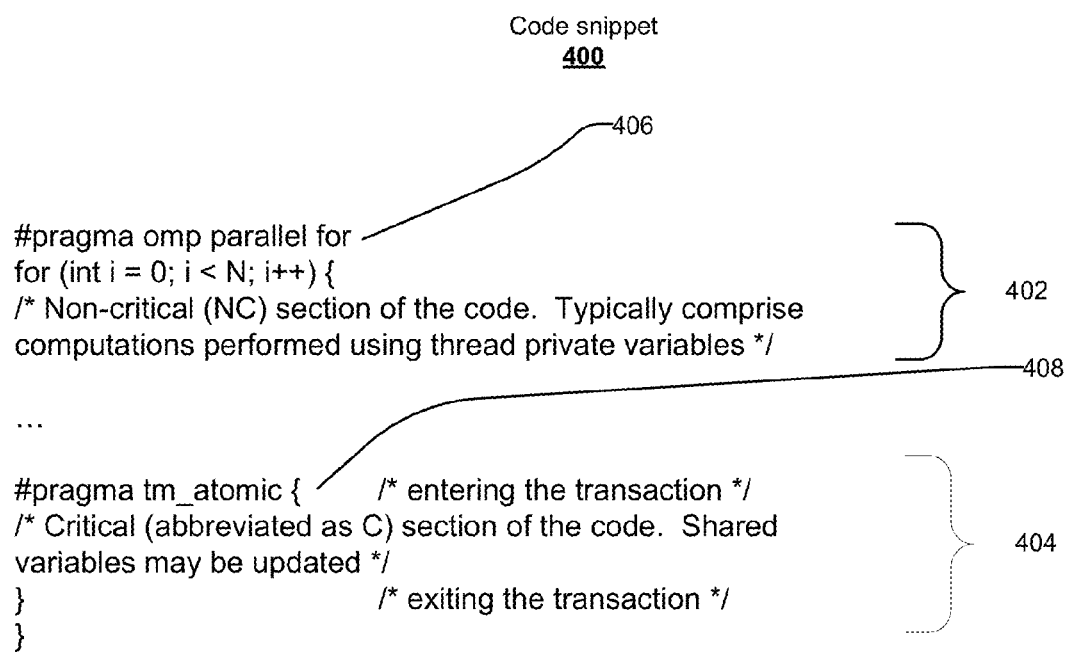
FIG. 4 is a textual representation of a source code snippet in accordance with one embodiment of the disclosure.

With reference to FIG. 4 a textual representation of a source code snippet in accordance with one embodiment of the disclosure is presented.

Statements 402 represent a set of statements associated with a non-critical portion of the program code. Non-critical code segments typically comprise statements for computations using thread private variables. Statement 406 represents an OMP specification in which parallel for is a combined form construct for creating a parallel region and a work sharing for constructs. The statement indicates the desired use of OMP, which are routines inside compiler runtime threading library 306 of FIG. 3.

Statements 404 represent a set of statements associated with a critical portion of the program code. Critical code regions typically comprise statements for computations using shared variables, which may be updated by multiple threads and therefore must be guarded. Statement 408 represents a start of a critical region of the program code by the specification of tm_atomic pragma.

With reference to FIG. 5 a textual representation of source code snippets representative of the stages of the process of the code versioning optimization system of FIG. 3 in accordance with one embodiment of the disclosure is presented. Code snippet 500 represents the three basic stages from source code to code after transactional memory promotion with loop versioning using the disclosed process. In the example of code snippet 500, NC1 represents a non-critical region 1, NC2 represents a non-critical region 2, and C represents a critical region.

Code portion 502 is representative of a portion of a program, using syntax of the programming language C according to OpenMP standard, in which a use of the OpenMP parallel functions is specified as indicated in statement 510 of #pragma omp parallel for. Although recited using the syntax of the programming language C, according to OpenMP standard there is an equivalent using syntax of the programming language Fortran as well. In the example statement, the portion parallel for is a combined form construct for creating a parallel region and work sharing for constructs. In a similar example, a program developer can also specify a statement of #pragma parallel {#pragma for { }} which would be an equivalent.

Continuing with the example, statement 508 (also shown as statement 408 in FIG. 4) further located into code portion 502 recites pragma tm_atomic indicating a start of a critical region of the program code. The pragma tm_atomic statement is translated by enhanced compiler 304 of FIG. 3 into calls to routines tm_begin( ) and tm_end( ), which are respectively responsible for entering and exiting a speculation sub-process associated with the respective critical region.

In response to the initial processing of code portion 502 an outlining operation is performed by the enhanced compiler on the portion of program code received to enable use of the threading library provided in the enhanced compiler runtime. This results in code shown in code portion 504. The outlining process also transforms the loop to take in a runtime trip count via the lower bound and upper bound parameters. As before the entry and exit tm routines are called to wrap the critical region in the program code that is outlined as shown in code portion 504.

In response to outlining the program code of code portion 502, a next step of the process is indicated in code portion 506. Code portion 506 illustrates selective optimizations using one of three different code versions as in statements 514, 516 and 518 as determined by the current context. Each code version in statements 514, 516 and 518 provides a separate path in which two of the code versions provided employ variants of transactional memory usage (as in statements 514 and 516) while a third code version provides a fallback to use conventional processing and not using transactional memory (as in statement 518).

During compile time, the enhanced compiler generates code portion 506, for example, all loop versions with versioning conditions. Code portion 504 is always generated to support parallel execution. During runtime, statistics are collected to alter the parameters of lower bound (lb), upper bound (ub), conflictH1, conflictH2 which accordingly alters a path of code execution. These particular parameters have default values initially, but may be altered depending on the amount of conflicts. However, the code is not recompiled using the statistics (for example, the code is generated once during compile time ONLY and altered later during runtime).

A first if statement of statement 514 determines whether a threshold for transactional memory usage and associated conflictH1 520 is met. When the condition of the first if statement is not met, a second if, in statement 516, using an else if form of statement determines whether a threshold for transactional memory usage and associated conflictH2 522 is met. When neither transactional memory usage condition is met the version of program code using conventional lock based processing is used as indicated in statement 518.

An embodiment of the disclosed process further instruments the routines of code portion 506 to gather statistics indicative of a conflict at runtime via the statistic collector. In response to a predetermined threshold being met or exceeded, a flag associated with conflictH1 520 or conflictH2 522 is raised. As shown in code portion 506, when conflictH1 520 or conflictH2 522 is set to return a value of TRUE, the respective transactional memory code versions are effectively ignored, thereby defaulting to a lock based critical region (the final else statement 518 of code portion 506).

The information learned from running one work share is accordingly used to guide whether transactional memory should be used again for a next work share. The work share may be in the same instance of the program code or in another parallel region. Therefore the information obtained from a first region may be reused in a next iteration of the code portion of that region or applied to one or more other regions processing a same instance of the code portion as the first region.

Furthermore, when dynamic work sharing is in effect, the lower bound (lb), and upper bound (ub) parameters, as in statement 524 may be adjusted as well as the usage of a number of threads to further improve a chance of entering the transactional memory exploiting versions of the code.

An embodiment of the disclosed process therefore provides a capability of static analysis and optimization at compile time in combination with a dynamic adaptive run time automatic adjustment, or self tuning function, to selectively determine which code path to use from the three alternatives available in accordance with a current context. Embodiments of the disclosed process provide a capability in the form of a transformation framework, including cost analysis, to bundle several iterations of a loop into a single transaction region.

A transformation is built upon unique outlining, and workload chunking mechanism in vendor specific implementations of an OpenMP® infrastructure (OpenMP provides an application programming interface (API) specification for parallel programming across multiple platforms, available from OpenMP.org) shown in 504. An embodiment, as in the examples of the disclosure, provides a capability to avoid incurring, for every iteration of an optimized loop, enter and exit overhead for each transaction by bundling a number of iterations into a transactional memory region. An embodiment uses a cost analysis, which considers conflict probability, and speculative state capacity during an evaluation.

Cost analysis (for example, as defined using the Equation 1 and the Equation 2) in the disclosed process does not explicitly take conflict probability into account. However an implied direct relationship in which as the number of iterations bundled into a transactional memory region increase, the more likely conflicts can arise in the region. The relationship is intuitive because as the number of iterations bundled into a transactional memory region increases a larger speculative state is expected, and accordingly a longer time spent inside the transactional memory region. Both events increase the likelihood of the transactional memory region suffering conflicts. ConflictH1 520 and conflictH2 522 parameters receive runtime-recorded information based on actual conflicts incurred by the transactional memory region provided by statistic analyzer. Hence, the disclosed cost analysis does not estimate conflictH1 520 and conflictH2 522 during compile time, rather leaving the calculation of respective conflict values to the runtime adjuster. The default setting of conflictH1 520 and conflictH2 522 are false to favor use of the transactional memory code paths, and the runtime adjuster may set them to true based on runtime statistics if too many conflicts are recorded.

The cost analysis accordingly receives input information including workload, amount of conflicts, conventional lock overhead, transactional memory enter and exit overhead as well as dynamic profiling information, to determine a particular code version to execute at runtime. Transactional memory promotion transformation is implemented using a compiler specific implementation of the OpenMP infrastructure to bundle several iterations, also referred to as a chunk size, of a loop into one transaction region.

Different code versions are accordingly created for code versions including lock based code (conventional code), transactional memory based code, and transactional memory based code with transactional memory promotion transformation, which are generated with runtime checks assuming use of OpenMP defined static work sharing. The OpenMP runtime, when dynamic scheduling is in effect, performs adaptive runtime optimization based on dynamic profiling information on the trip count parameter. Note altering trip count parameters of lb, ub has a direct influence on the number of loop iterations bundled into the tm region as shown in 524.

An embodiment of the disclosed process therefore comprises a set of operations which use an existing outlining mechanism for an OpenMP parallel loop, performs a loop cost analysis associated with the parallel loop and transactional memory promotion transformation with proper loop versioning in the outlined code.

With reference to FIG. 6 a block diagram of an optimization range associated with using the code versioning optimization system of FIG. 3 in accordance with one embodiment of the disclosure is presented. Optimization range 600 is an example of a range of values used in determining which particular code version is applicable from among the three versions described in FIG. 5.

To accurately derive a cost model, and therefore cost of optimization 602, the loop or workload is characterized in terms of a number of cycles. Assuming a large value of n (many iterations of the loop) and very low conflict probability, the time expressed in machine cycles needed to execute the code in the example of FIG. 4 is as follows:

when parallelizing the loop with critical region guarded using transactional memory: $n*(c+x+nc)/t$ cycles;
when parallelizing the loop with critical section guarded using global locking:
$n*(c+y)$ for $nc<=(c+y)*(t-1)$ for non-workload dominated case, or,
$n*(c+y+nc)/t$ for $nc>(c+y)*(t-1)$ for workload dominated case;

(switching from the non-workload dominated case into the workload dominated case can be intuitively understood when the nc work of one thread is more than the threshold, and can be overlapped with the ((c+y)*(rest of the other threads in the system)) and is therefore expressed as (c+y)*(t−1))

when executing sequentially using single thread on a single core: n*(c+nc)

An assumption of a large value of n in the current context means when a parallel thread spawning overhead can be ignored. If n is too small, then the time taken to execute a loop is dominated by the OMP runtime overhead (for example, thread spawning, synchronizing). A very low conflict probability is defined as a situation in which the transactional memory region does not rollback too often or at all, because rollback adds additional time to re-execute the region. Modeling as disclosed holds true under these assumptions.

To further clarify the constraints of the upper bound ub upper bound EQ2 606 and lower bound lb parameters as in lower bound EQ1 604 are controlled at runtime. Using OMP, a user can specify a number of threads to use. The upper bound and lower bound (ub, lb) applicable to a thread during execution (for example, the chunk size) are dependent upon a number of threads in a team (collaborating), or as otherwise described, scheduling.

Continuing with the previous example, assume a value of the entry overhead and the exit overhead x is 600 and the value of the global locking overhead for the transaction region y is 200 cycles. The values may be derived using an approximation by performing measurement using known instrumentations. For example, a time based register value before a tm region begins or locking (when the critical region is empty) is recorded and then the time based register is recorded again after transactional memory region ends or unlocking. The difference in recorded values between the two operations is then taken.

A lower bound EQ1 604 in the form of a simplified Equation 1 may then be expressed as k>600/(c+nc). A threshold for TM promotion would accordingly be a condition expressed as: if ((ub−lb)>600/(c+nc) && (ub−lb)*(loads+stores inside)<2048). The values of 600 and 2048 are dependent upon a particular hardware system. In the example used a measured 600 cycles representative of a BlueGene Q system is used as an example to illustrate the concept of the disclosure (a supercomputer available from International Business Machines Corporation).

Further when the value of nc is almost zero (implying one of an absence of non-critical code or when the non-critical code takes very little time, for example, when only incrementing a shared variable (e.g. a+=1 where a is a shared variable)) and a value of c is 20 cycles, then 31 threads with transactional memory would be required to be on par with the performance of a single thread. When the value of c+nc is larger than 600, (the value of the entry overhead and the exit overhead previously stated) then 2 threads with transactional memory starts to outperform a serial execution (single thread instance).

As the transactional memory region is artificially increased, for example, to a value of k iterations (chunk size) of the loop bundled into a single transaction, the transactional memory case becomes more appealing to use. With transactional memory and k iterations, the cost expression becomes: n/k*((c+nc)*k+600)/t cycles. At this value of k, where k>600/((c+nc)*(t−1)), referred to as Equation 1 or as lower bound EQ1 604, the performance of the transactional memory case begins to outperform the serial execution instance. Two transactional memory threads accordingly start to outperform a single thread at k>600/(c+nc).

In response to obtaining the estimate for iterations of the loops to be bundled into a single transaction, the cost model of an embodiment of the disclosed process proceeds to ensure no capacity overflow occurs. A conservative estimate is applied which is machine dependent and should be substituted with the appropriate machine parameters using a particular hardware platform of a target implementation. Assuming a speculative state buffer in a cache has a size of M bytes and a total number of hardware threads is T, then each thread is estimated to have a capacity of M/T bytes. A further assumption is made that each speculative load or each speculative store will occupy a respective cache line. Therefore, the respective thread capacity (M/T) is divided by the size of a cache line expressed as (M/T)/cache line, and referred to as Equation 2, or as upper bound EQ2 606.

Equation 2 is used as an upper bound against a total number of unique loads and stores in a respective workload. Using Blue Gene/Q as an example with a speculative buffer of approximately 16M in size implemented in a L2 cache, 64 hardware threads per node, and 128 byte L2 cache line size, the upper limit would be estimated as: 2048 loads or stores. (16M/64 divided by 128 yields 2048, as in Equation 2).

Equation 1 and Equation 2 are accordingly used to derive a threshold value for determining use of a code version of transactional memory use and a threshold value for determining use of a code version of transactional memory promotion with loop versioning as shown in FIG. 5, assuming static work sharing. One can readily count a number of loads and stores inside a loop and multiply the count by k computed by Equation 1. When the resulting value exceeds what is computed from Equation 2, then k needs to be made smaller. The constraint formula is therefore expressed as: (number of loads+ stores in single loop iteration)*(k computed from Equation 1)<Equation 2. According to code portion 506 of FIG. 5, the lower bound lb and the upper bound ub are passed into the outlined_junc at runtime. The ub-lb is accordingly a value of k as previously described. The threshold for TM promotion is therefore computed by plugging the value of k into the constraint formula just described. When the condition expressed in the constraint is satisfied, the instructions enter into the segment of the code defined in a respective if condition (one of the three code versions of FIG. 5).

Figure 7:
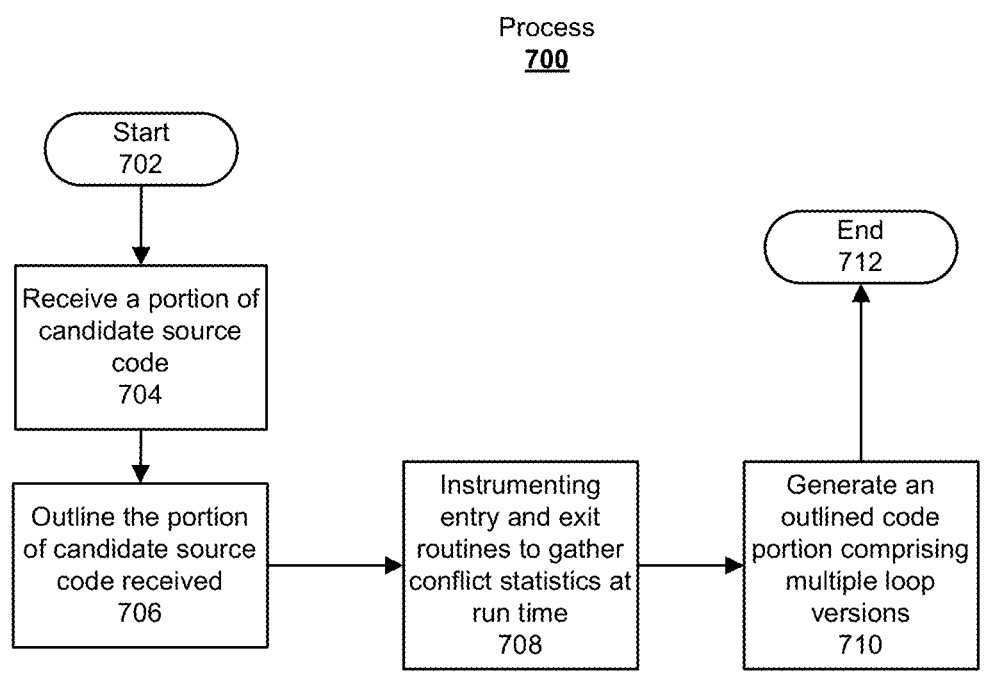
FIG. 7 is a flowchart of a compile time process using the code versioning optimization system of FIG. 3 in accordance with one embodiment of the disclosure.

With reference to FIG. 7 a flowchart of a compile time process using the code versioning optimization system of FIG. 3 in accordance with one embodiment of the disclosure is presented. Process 700 is an example of a process using code versioning optimization system 300 of FIG. 3.

Process 700 begins (step 702) and receives a portion of candidate source code (step 704). The candidate source contains program source code statements of a program that is amenable to parallel processing.

Process 700 outlines the portion of candidate source code received (step 706). An outliner operation typically extracts a code segment (one or more consecutive program code statements) from a specified function, which is referred to as a host or initial function, thereby creating a new function. The new function is referred to as the outlined function. The outlining operation replaces the original code segment with a call to the newly created outlined function. The technique is used to enable parallel execution of the outlined function. In the disclosed process the entry and exit routines wrapping a critical code region are the tm_begin/tm_end routines, which respectively start and end the speculation sub-process. In the current case outlining is performed on an OpenMP parallel loop.

Process 700 presents a logic flow. The entry and exit routines to enable gathering of conflict statistics at runtime are added (step 708). The conflict statistics obtained at run time are analyzed to aid in adjusting of an upper bound parameter and a lower bound parameter associated with the versioning condition, or set the conflictH1, conflictH2 parameters. A loop cost is defined after characterizing the loop/workload in terms of a number of cycles. The cycle values are machine dependent values dependent upon the underlying hardware platform used.

The time taken to execute the parallelized loop with a critical region using transactional memory promotion uses a costing expression defined as $n*(c+x+nc)/t$ machine cycles. The time taken to execute the parallelized loop with a critical region using default global locking uses a costing expression defined as: $n*(c+y)$ for $nc<=(c+y)*(t-1)$ and as $n*(c+y+nc)/t$ for $nc>(c+y)*(t-1)$ for a workload dominated case. Executing the loop sequentially using a single thread without any parallelization on a single core uses a costing expression defined as: $n*(c+nc)$.

Process 700 generates an outlined code portion comprising multiple loop versions (step 710). The multiple loop versions are contained in the outlined representation of the candidate source code with a critical region wrapped by critical region entry and exit routines. The multiple loop versions represent a version parallelizing the loop with a critical region using transactional memory, a version parallelizing the loop with a critical region using global locking and a version using sequential execution using a single thread on a single core. Process 700 terminates thereafter (step 712).

With reference to FIG. 8 a flowchart of a run time process using the code versioning optimization system of FIG. 3 in accordance with one embodiment of the disclosure. Process 800 is an example of a run time process using an embodiment of code versioning optimization system 300 of FIG. 3 and intermediate result from process 700 of FIG. 7.

Process 800 begins and executes an outlined and instrumented multiple loop versions code portion (step 804). The multiple loop versions comprise the previously generated versions of a version specific to parallelizing the loop with a critical region using transactional memory, a version created for parallelizing the loop with a critical region using global locking and a version using sequential execution using a single thread on a single core.

During execution the instrumentation gathers conflict statistics at runtime, which are analyzed to determine whether a predetermined threshold for transactional memory promotion with a conflict parameter associated with a first versioning condition should be altered (step 806) (for example, by setting conflictH1 to true). Responsive to a determination the predetermined threshold for transactional memory promotion with a first conflict is not met process 800 selects and uses a transactional memory promotion approach (step 808) and terminates thereafter (step 816). Transactional memory promotion in the context of the disclosure means promotion of the transactional memory pragma (or region) from inside the loop being processed to outside of the loop being processed.

Responsive to a determination the predetermined threshold for transactional memory promotion with a conflict parameter associated with the first versioning condition is met, process 800 determines whether a predetermined threshold for transactional memory with a second conflict parameter associated with a second versioning condition is met (step 810). Responsive to a determination the predetermined threshold for transactional memory with a second conflict parameter associated with the second versioning condition is not met process 800 selects and uses a transactional memory approach (step 812) and terminates thereafter (step 816). Responsive to a determination the predetermined threshold for transactional memory with a second conflict parameter associated with the second versioning condition is met process 800 uses a default lock based approach (step 814) and terminates thereafter (step 816).

Thus is presented in an illustrative embodiment a computer-implemented process for a computer-implemented process for code versioning for enabling transactional memory region promotion receives a portion of candidate source code and outlines the portion of candidate source code received for parallel execution. The computer-implemented process wraps the critical region with entry and exit routines to enter into the speculation sub-process and at the same time, to gather conflict statistics at run time. The computer-implemented process generates an outlined code portion comprising of multiple loop versions. The outlined code portion is executed, with runtime statistics; and determines which one of multiple loop versions to execute according to the conflict statistics gathered at run time.

In one embodiment a computer-implemented process for code versioning for enabling transactional memory region promotion, estimates a number of iterations k of a loop to be bundled into a single transaction by characterizing a loop or workload in terms of a number of machine cycles, wherein the number of cycles is machine dependent and the characterizing assumes a loop with n iterations, each iteration with c number of cycles in a critical section, nc number of cycles in a non-critical section and there are t threads to execute a parallel loop, and wherein n is large and a conflict probability is low, the number of machines cycles is required to execute the loop, assuming a transaction region enter and exit overhead of x number of cycles and a global locking overhead of y number of cycles, represented in an expression as $n*(c+x+nc)/t$ cycles, which is reduced to an expression of $k>x/((c+nc)*(t-1))$, (Equation 1). Equation 1 is derived on first performing transaction promotion where k iterations of the loop are executed inside the transaction. Specifically, $n*(c+x+nc)/t$ becomes $n/k*((c+nc)*k+x)/t$ through the promotion process. Then constraining $n/k*((c+nc)*k+x)/t$ to be less than $n*(c+nc)$ which is the time taken by sequential execution, the inequality condition defined is as expressed by Equation 1.

The computer implemented process further calculates an upper bound against a total number of unique loads and stores in the workload by estimating each thread capacity as M/T bytes, wherein a speculative state buffer in cache is M bytes and a total number of hardware threads is T, and wherein each speculative load or speculative store occupies its own cache line, therefore, the thread capacity is further divided by the size of a cache line as in (M/T)/cache line (Equation 2); and calculating a threshold for transactional memory (TM), and a threshold for transactional memory promotion with loop versioning using Equation 1 and Equation 2.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for code versioning for enabling transactional memory region promotion, the computer-implemented process comprising:
    receiving a portion of candidate source code;
    outlining the portion of candidate source code received for parallel execution;
    wrapping a critical region with entry and exit routines to enter into a speculation sub-process, wherein the entry and exit routines also gather conflict statistics at run time;
    generating an outlined code portion comprising multiple loop versions using a processor;
    executing the outlined code portion comprising multiple loop versions;
    determining whether a predetermined threshold for transactional memory (TM) promotion with a first versioning condition is being met using an expression of ((number of loads+stores in single loop iteration)*(k from Equation 1)<Equation 2) && !conflictH1, wherein k is a number of iterations of a loop to be bundled into a single transaction, and Equation 1 is defined as $k > x/((c+nc)*(t-1))$ and Equation 2 is defined as (M/T)/cache line, wherein M is a number of bytes in a speculative buffer cache, T is a number of hardware threads and cache line represents a machine specific value of a size of a line of cache in bytes and wherein there are n iterations in a loop, each iteration having c number of cycles in a critical region, and nc number of cycles in a non-critical region, a machine specific value of transaction region enter and exit overhead of x number of cycles and t number of threads;
    responsive to a determination the predetermined threshold for transaction memory (TM) promotion with the first versioning condition is met, determining whether a predetermined threshold for transaction memory (TM) promotion with a second versioning condition is met using the expression; and
    responsive to a determination the predetermined threshold for transaction memory (TM) promotion with the second versioning condition is met; using a default lock based approach.

2. The computer-implemented process of claim 1, wherein responsive to a determination the predetermined threshold for transactional memory (TM) promotion with the first versioning condition is not met using the expression, using a TM promotion approach.

3. The computer-implemented process of claim 1, wherein responsive to a determination the predetermined threshold for transactional memory (TM) promotion with the second versioning condition is not met using the expression, using a TM approach.

4. The computer-implemented process of claim 1, further comprising parallelizing the loop with a critical region using TM promotion using a costing expression defined as $n*(c+x+nc)/t$ cycles wherein there are n iterations in a loop, each iteration having c number of cycles in a critical region, and nc number of cycles in a non-critical region, transaction region enter and exit overhead of x number of cycles and t number of threads.

5. The computer-implemented process of claim 1, further comprising parallelizing the loop with a critical region using global locking using a costing expression defined as one of $n*(c+y)$ for $nc <= (c+y)*(t-1)$ and as $n*(c+y+nc)/t$ for $nc > (c+y)*(t-1)$, for a workload dominated case wherein there are n iterations in a loop, each iteration having c number of cycles in a critical region, and nc number of cycles in a non-critical region, a global locking overhead of y cycles and t number of threads.

6. The computer-implemented process of claim 1, further comprising executing the code sequentially using a single thread, thus requiring no locking, using a costing expression defined as $n*(c+nc)$, wherein there are n iterations in a loop, each iteration having c number of cycles in a critical region, and nc number of cycles in a non-critical region.

7. A computer program product for code versioning for enabling transactional memory region promotion, the computer program product comprising a computer readable storage medium having program instructions embodied therewith, wherein the computer readable storage medium is not a transitory signal per se, the program instructions executable by a processor to perform a method comprising:
  receiving a portion of candidate source code;
  outlining the portion of candidate source code received for parallel execution;
  wrapping a critical region with entry and exit routines to enter into a speculation sub-process, wherein the entry and exit routines also gather conflict statistics at run time;
  generating an outlined code portion comprising multiple loop versions;
  executing the outlined code portion comprising multiple loop versions;
  determining whether a predetermined threshold for transactional memory (TM) promotion with a first versioning condition is being met using an expression of ((number of loads+stores in single loop iteration)*(k from Equation 1) Equation 2) && !conflictH1, wherein k is a number of iterations of a loop to be bundled into a single transaction, and Equation 1 is defined as $k > x/((c+nc)*(t-1))$ and Equation 2 is defined as $(M/T)/cache\ line$, wherein M is a number of bytes in a speculative buffer cache, T is a number of hardware threads and cache line represents a machine specific value of a size of a line of cache in bytes and wherein there are n iterations in a loop, each iteration having c number of cycles in a critical region, and nc number of cycles in a non-critical region, a machine specific value of transaction region enter and exit overhead of x number of cycles and t number of threads;
  responsive to a determination the predetermined threshold for transaction memory (TM) promotion with the first versioning condition is met, determining whether a predetermined threshold for transaction memory (TM) promotion with a second versioning condition is met using the expression; and
  responsive to a determination the predetermined threshold for transaction memory (TM) promotion with the second versioning condition is met; using a default lock based approach.

8. The computer program product of claim 7, wherein the method further comprises, responsive to a determination the predetermined threshold for transaction memory (TM) promotion with the first versioning condition is not met using the expression, further comprises computer executable program code for using a TM promotion approach.

9. The computer program product of claim 7, wherein the method further comprises, responsive to a determination the predetermined threshold for transaction memory (TM) promotion with the second versioning condition is not met using the expression, further comprises computer executable program code for using a TM approach.

10. The computer program product of claim 7, wherein the method further comprises parallelizing the loop with a critical region using TM promotion using a costing expression defined as $n*(c+x+nc)/t$ cycles wherein there are n iterations in a loop, each iteration having c number of cycles in a critical section, and nc number of cycles in a non-critical region, transaction region enter and exit overhead of x number of cycles and t number of threads.

11. The computer program product of claim 7, wherein the method further comprises parallelizing the loop with a critical region using global locking using a costing expression defined as one of $n*(c+y)$ for $nc <= (c+y)*(t-1)$ and as $n*(c+y+nc)/t$ for $nc > (c+y)*(t-1)$ for a workload dominated case wherein there are n iterations in a loop, each iteration having c number of cycles in a critical region, and nc number of cycles in a non-critical region, and a global locking overhead of y cycles and t number of threads.

12. The computer program product of claim 7, wherein the method further comprises running sequentially using a single thread, thus requiring no locking, using a costing expression defined as $n*(c+nc)$, wherein there are n iterations in a loop, each iteration having c number of cycles in a critical region, and nc number of cycles in a non-critical region.

13. An apparatus for code versioning for enabling transactional memory region promotion, the apparatus comprising:
  a communications fabric;
  a memory connected to the communications fabric, wherein the memory contains computer executable program code; and
  a processor unit connected to the communications fabric, wherein the processor unit, responsive to executing the computer executable program code, initiates executable operations comprising:
  receiving a portion of candidate source code;
  outlining the portion of candidate source code received for parallel execution;
  wrapping a critical region with entry and exit routines to enter into a speculation sub-process, wherein the entry and exit routines also gather conflict statistics at run time;
  generating an outlined code portion comprising multiple loop versions;
  executing the outlined code portion comprising multiple loop versions;
  determining whether a predetermined threshold for transactional memory (TM) promotion with a first versioning condition is being met using an expression of ((number of loads+stores in single loop iteration)*(k from Equation 1) Equation 2) && !conflictH1, wherein k is a number of iterations of a loop to be bundled into a single transaction, and Equation 1 is defined as $k > x/((c+nc)*(t-1))$ and Equation 2 is defined as $(M/T)/cache\ line$, wherein M is a number of bytes in a speculative buffer cache, T is a number of hardware threads and cache line represents a machine specific value of a size of a line of cache in bytes and wherein there are n iterations in a loop, each iteration having c number of cycles in a critical region, and nc number of cycles in a non-critical region, a machine specific value of transaction region enter and exit overhead of x number of cycles and t number of threads;
  responsive to a determination the predetermined threshold for transaction memory (TM) promotion with the first versioning condition is met, determining whether a predetermined threshold for transaction memory (TM) promotion with a second versioning condition is met using the expression; and
  responsive to a determination the predetermined threshold for transaction memory (TM) promotion with the second versioning condition is met; using a default lock based approach.

14. The apparatus of claim 13, wherein the executable operations further comprise, responsive to a determination the predetermined threshold for transactional memory (TM)

promotion with the first versioning condition is not met using the expression, using a TM promotion approach.

15. The apparatus of claim 13, wherein the executable operations further comprise, responsive to a determination the predetermined threshold for transaction memory (TM) promotion with the second versioning is not met using the expression, using a TM approach.

16. The apparatus of claim 13, wherein the executable operations further comprises parallelizing the loop with a critical region using TM promotion using a costing expression defined as $n*(c+x+nc)/t$ cycles wherein there are n iterations in a loop, each iteration having c number of cycles in a critical region, and nc number of cycles in a non-critical region, transaction region enter and exit overhead of x number of cycles and t number of threads.

17. The apparatus of claim 13, wherein the executable operations further comprise parallelizing the loop with a critical region using global locking using a costing expression defined as one of $n*(c+y)$ for $nc<=(c+y)*(t-1)$ and as $n*(c+y+nc)/t$ for $nc>(c+y)*(t-1)$, for a workload dominated case wherein there are n iterations in a loop, each iteration having c number of cycles in a critical region, and nc number of cycles in a non-critical region, a global locking overhead of y cycles and t number of threads.

* * * * *